United States Patent
Holla et al.

(10) Patent No.: US 10,348,683 B2
(45) Date of Patent: Jul. 9, 2019

(54) NETWORK PACKET FILTERING VIA MEDIA ACCESS CONTROL (MAC) ADDRESS LEARNING

(71) Applicant: Nicira, Inc., Palo Alto, CA (US)

(72) Inventors: Aditya Holla, Palo Alto, CA (US); Wenyi Jiang, Fremont, CA (US); Shrikrishna Khare, Sunnyvale, CA (US); Ayyappan Veeraiyan, Cupertino, CA (US); Rajeev Nair, Newark, CA (US)

(73) Assignee: Nicira Inc., Palo Alto, CA (US)

( * ) Notice: Subject to any disclaimer, the term of this patent is extended or adjusted under 35 U.S.C. 154(b) by 56 days.

(21) Appl. No.: 15/801,487

(22) Filed: Nov. 2, 2017

(65) Prior Publication Data
US 2019/0132286 A1 May 2, 2019

(51) Int. Cl.
| | |
|---|---|
| *H04L 29/06* | (2006.01) |
| *H04L 12/46* | (2006.01) |
| *H04L 12/721* | (2013.01) |
| *H04L 12/851* | (2013.01) |
| *H04L 12/931* | (2013.01) |
| *H04L 12/24* | (2006.01) |
| *H04L 29/12* | (2006.01) |

(52) U.S. Cl.
CPC ...... *H04L 63/0236* (2013.01); *H04L 12/4641* (2013.01); *H04L 41/0806* (2013.01); *H04L 45/66* (2013.01); *H04L 47/2441* (2013.01); *H04L 49/70* (2013.01); *H04L 49/354* (2013.01); *H04L 61/6022* (2013.01)

(58) Field of Classification Search
CPC . H04L 63/0236; H04L 49/70; H04L 12/4641; H04L 61/6022
See application file for complete search history.

(56) References Cited

U.S. PATENT DOCUMENTS

| | | | |
|---|---|---|---|
| 2011/0035494 A1* | 2/2011 | Pandey | G06F 9/5077 709/224 |
| 2011/0299413 A1* | 12/2011 | Chatwani | H04L 12/4625 370/252 |
| 2014/0064056 A1* | 3/2014 | Sakata | H04L 41/00 370/216 |
| 2015/0055468 A1* | 2/2015 | Agarwal | H04L 49/9047 370/232 |
| 2019/0028435 A1* | 1/2019 | Khare | H04L 63/0236 |

* cited by examiner

*Primary Examiner* — Hashim S Bhatti

(57) ABSTRACT

Described herein are systems, methods, and software to enhance the management of packet filters for host computing systems. In one implementation, a computing system may identify media access control (MAC) addresses and communication statistics for virtual nodes communicating over physical network interfaces of the computing system. The computing system may further prioritize the MAC addresses based on the virtual network interface ports and physical network interface ports that the MAC addresses were identified on, and generate a filter configuration for the physical network interfaces based on the prioritization and the communication statistics.

20 Claims, 9 Drawing Sheets

| MAC ADDRESSES 510 | VNIC PORT ID 512 | VNIC PRIORITY VALUE 514 | PHYSICAL NIC ID 516 | PHYSICAL NIC PRIORITY VALUE 518 | OVERALL PRIORITY VALUE 520 |
|---|---|---|---|---|---|
| MAC ADDRESS 423 | VNIC 441 | 0000 | PHYSICAL NIC 450 | 0000 | VALUE 460 |
| MAC ADDRESS 424 | VNIC 441 | 0001 | PHYSICAL NIC 450 | 0001 | VALUE 461 |
| MAC ADDRESS 425 | VNIC 442 | 0000 | PHYSICAL NIC 450 | 0002 | VALUE 462 |
| MAC ADDRESS 426 | VNIC 442 | 0001 | PHYSICAL NIC 451 | 0000 | VALUE 463 |
| | | | | | |

DATA STRUCTURE 500

FIGURE 5

DATA STRUCTURE 700

| MAC ADDRESSES 510 | VNIC PORT ID 512 | VNIC PRIORITY VALUE 514 | PHYSICAL NIC ID 516 | PHYSICAL NIC PRIORITY VALUE 518 | OVERALL PRIORITY 520 |
|---|---|---|---|---|---|
| MAC ADDRESS 423 | VNIC 441 | 0000 | PHYSICAL NIC 450 | 0000 | VALUE 460 |
| MAC ADDRESS 424 | VNIC 441 | 0001 | PHYSICAL NIC 450 | 0001 | VALUE 461 |
| MAC ADDRESS 425 | VNIC 442 | 0000 | PHYSICAL NIC 450 | 0002 | VALUE 462 |
| MAC ADDRESS 426 | VNIC 442 | 0001 | PHYSICAL NIC 451 | 0000 | VALUE 463 |
| MAC ADDRESS 427 | VNIC 441 | 0002 | PHYSICAL NIC 451 | 0001 | VALUE 464 |

FIGURE 7

NETWORK PACKET FILTERING VIA MEDIA ACCESS CONTROL (MAC) ADDRESS LEARNING

BACKGROUND

In computing environments, virtual switches may be used that comprise software modules capable of providing a communication platform for one or more virtual nodes in the computing environment. These virtual switches may provide switching operations, routing operations, distributed firewall operations, and the like, and may be used to intelligently direct communication on the network by inspecting packets before passing them to other computing nodes (both real and virtual). For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like within the data packet and, when identified, provide a set of actions to be asserted against the data packet. These actions may include modifications to the data packet, and forwarding rules for the data packet, amongst other possible operations.

In some implementations, to provide the virtual switching operations, the virtual switch may be required to transfer and receive packets for the virtual nodes over one or more physical network interfaces of the host computing system. To support the communication of these packets over the physical network interfaces, the host may be capable of configuring the physical network interfaces to maintain a quality of service for packets destined for the virtual nodes by implementing filters for received packets. However, difficulties can arise in classifying data packets destined for nested virtual nodes, such as a container operating within a virtual machine, or a virtual machine operating within a virtual machine. Further, memory constraints for memory allocated to the physical network interfaces may limit the number of filters that can be implemented at the interfaces. Consequently, difficulties arise in determining which of the virtual nodes operating on the host system receive a packet filter due to the memory constraints.

Overview

The technology disclosed herein enhances the management of data packet communications for virtual nodes over a physical network interface. In one implementation, a method of managing packet filters for physical network interfaces of a host computing system includes obtaining dispatch statistics for media access control (MAC) addresses associated with virtual nodes communicating over physical network interfaces via a virtual switch. The method further provides, for each MAC address in the MAC addresses, identifying a priority value based on a virtual network interface port and a physical network interface of the physical network interfaces that the MAC address was identified on by the virtual switch, and identifying a subset of the MAC addresses that meet filter criteria based on the priority values. The method also includes identifying a filter configuration for the subset of the MAC addresses based on the dispatch statistics for the subset of the MAC addresses, and applying the filter configuration at the physical network interfaces.

BRIEF DESCRIPTION OF THE DRAWINGS

FIG. 5 illustrates a data structure to manage priority information for media access control (MAC) addresses identified for virtual nodes on a host according to an implementation.

FIG. 7 illustrates a data structure to manage priority information for MAC addresses identified for virtual nodes on a host according to an implementation.

DETAILED DESCRIPTION

Figure 1:
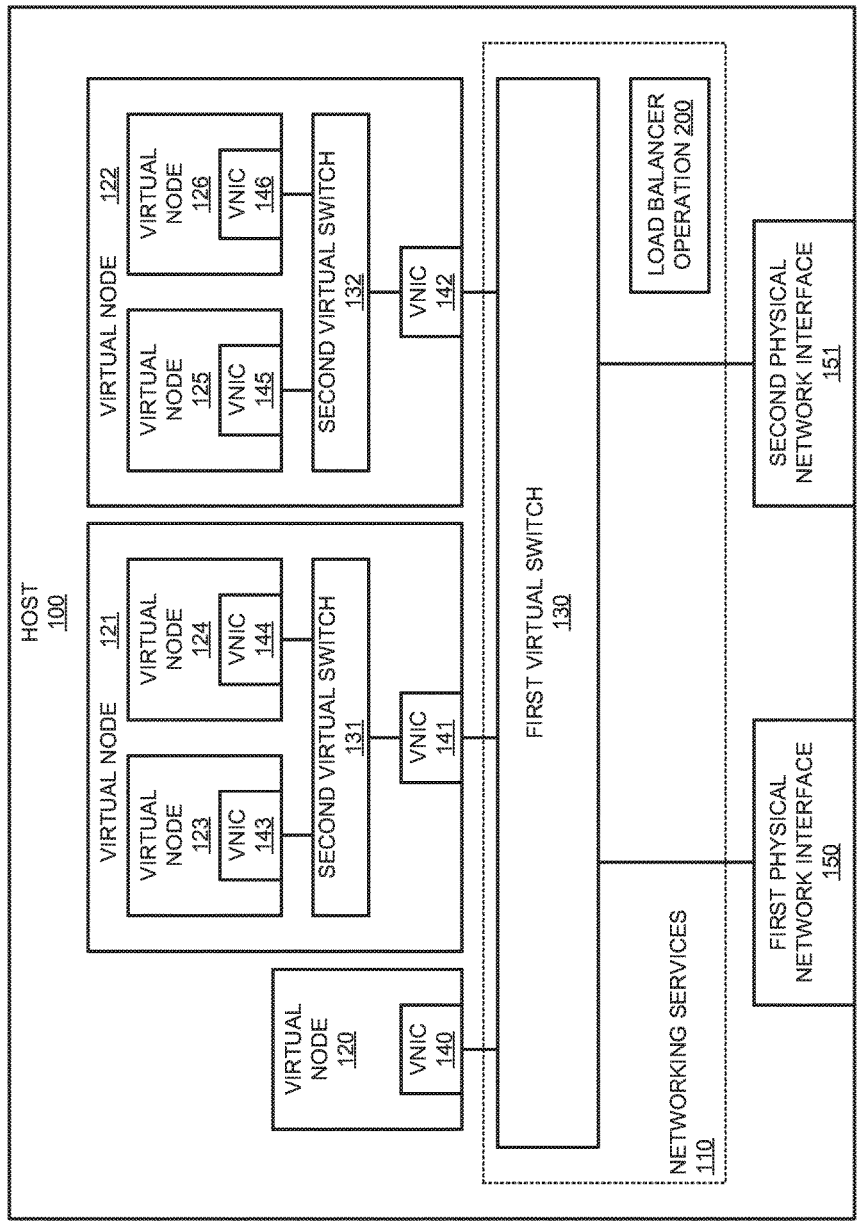
FIG. 1 illustrates a host that provides a platform for a plurality of virtual nodes according to an implementation.

FIG. 1 illustrates a host 100 that provides a platform for a plurality of virtual nodes according to an implementation. Host 100 includes virtual nodes 120-126, virtual switches 130-132, physical network interfaces 150-151, and load balancer operation 200 that works in conjunction with first virtual switch 130 to provide networking services 110. Virtual nodes 120-126 further includes VNICs 140-146 that provide connectivity to virtual switches 130-132.

In operation, host 100 provides a platform for the execution of virtual nodes 120-126, wherein virtual nodes 120-126 may comprise full operating system virtual machines and virtual nodes 123-126 may comprise full operating system virtual machines or containers. Full operating system virtual machines execute via a hypervisor, and run their own operating system kernel via abstracted processing system resources, storage resources, network resources, and the like provided by the hosting hypervisor. Unlike virtual machines, containers, which may comprise Docker containers, Linux containers, or some other similar type of container, share host resources, such as kernel resources of the host operating system (from host 100) and any allocated shared binaries. In this case, virtual nodes 123, 124 may share the operating system resources of their host VM (virtual node 121) and virtual nodes 125, 126 may share the operating system resources of their host VM (virtual node 122). The containers may include their own identifier space and file structure, and may be allocated separate virtual network interfaces on the host system.

In the present implementation, to provide the networking for virtual nodes 120-126, VNICs 140-146 are provided that communicate via virtual switches 130-132. Virtual switches 130-132 comprise software modules capable of providing switching operations, routing operations, distributed firewall operations and the like. Virtual switches 130-132 are "virtual" in the sense that they are implemented in software, but they are connected to and communicate with the physical network via physical network interfaces 150, 151. The virtual switches are responsible for forwarding packets between virtual nodes on the same host, and are further responsible for managing packets for the virtual nodes that are transmitted and/or received over physical network interfaces 150-151. In providing communications with other physical computing systems for the virtual nodes, load balancer operation 200 works in conjunction with physical network interface 150 to filter and classify packets as they are received from the physical network. By filtering packets as they are received over the network, load balancer operation 200 may ensure that packets are provided adequate processing resources of host 100. In particular, load balancer operation 200 may be used to configure physical network interfaces 150-151, such that packets received at the interface are placed in processing queues based on attributes within the packets, wherein the queues are each accessed by a thread executing on one core of a central processing unit (CPU) (not shown) of host 100, thus distributing the load of processing the queues across multiple CPU cores. As a result of this configuration, load balancer operation 200 is responsible for configuring the physical network interface, but does not sit in the data path for the communicating packets.

Figure 2:
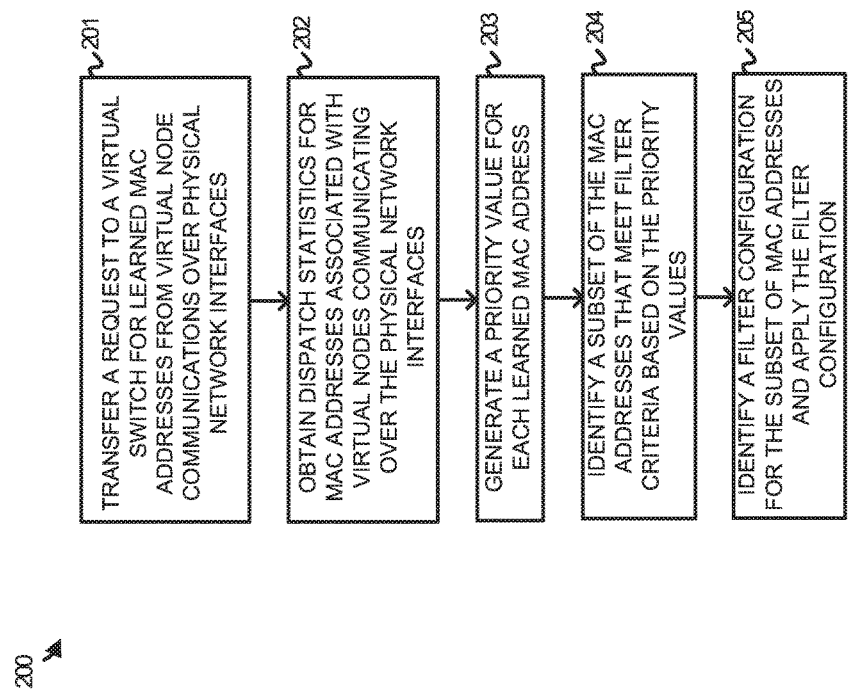
FIG. 2 illustrates a method of operating load balancer operation to manage packet filters for virtual nodes according to an implementation.

FIG. 2 illustrates a method of operating load balancer operation 200 to manage packet filters for virtual nodes according to an implementation. The operations of the method are referenced parenthetically in the paragraphs that follow with reference to systems and elements of host 100 in FIG. 1.

As depicted, load balancer operation 200 may transfer (201) a request to a virtual switch for learned media access control (MAC) addresses from virtual node communications over the physical network interfaces. In particular, when a virtual node requires a communication over a physical network interface, such as virtual node 125, first virtual switch 130 may identify the MAC address corresponding to the virtual node. In some implementations, in identifying the MAC address, first virtual switch 130 may identify the virtual network interface port that the MAC address was learned on as well as the physical network interface that was used for the first communication for the MAC address. This virtual and physical interface information may represent a portion of dispatch statistics for the particular MAC address. Using the example of virtual node 125 communicating via second physical network interface 151, first virtual switch 130 may identify that the MAC address was learned on the port for VNIC 142 and that the communication used second physical network interface 151. In addition to identifying the virtual network interface port and the physical interface used for the communication, first virtual switch 130 may also be used identify additional dispatch statistics for the corresponding MAC address. These additional dispatch statistics may include information about the quantity of data being communicated by each of the MAC addresses, such as the number of packets transmitted by each MAC address, a number of packets received by each MAC address, a number of bytes transmitted by each MAC address, a number of bytes received by each MAC address, or some other similar dispatch statistic. As the dispatch statistics are monitored and maintained for the identified MAC addresses by first virtual switch 130, load balancer operation 200 may request the dispatch statistics at various intervals, wherein the intervals may be periodic, based on a current load at the physical network interfaces, or based on any other similar interval.

Once the information is requested, load balancer operation 200 further obtains (202) dispatch statistics for MAC addresses associated with virtual nodes communicating over the physical network interfaces from first virtual switch 130. The dispatch statistics that are obtained may comprise the statistics for a recent period of time, such as the last ten minutes, may comprise statistics from when the virtual switch was initiated, or may comprise statistics for any other time period. Once the dispatch statistics are obtained from virtual switch 130, the method then generates (203) a priority value for each of the learned MAC addresses. In some implementations, in generating the priority value, the value may be determined at least in part on the order that the MAC addresses were identified on the virtual network interface port, and the order that MAC addresses were identified as communicating over the physical network interface. For example, if the MAC address for virtual node 123 were identified prior to the MAC address for virtual node 124, then virtual node 123 may have a higher priority value associated with the VNIC 141. Further, if the MAC address for virtual node 123 were identified prior to the MAC address for virtual node 124 on first physical network interface 150, then virtual node 123 may have a higher priority value associated with the physical network interface. Once the values are identified for the virtual network interface port and the physical network interface, the values may then be used to generate the overall priority value associated with the MAC address. This overall value may be determined by adding the two values, multiplying the two values, combining the two values into a single value, or some other similar operation on the value.

After determining the priority value for each of the MAC addresses, the method further includes identifying (204) a subset of the MAC addresses that meet filter criteria based on the priority values. In some implementations, the memory space for filters at the physical network interfaces may be limited, limiting the number of filters that can be implemented for virtual nodes operating on host 100. To overcome the limitation, MAC addresses with the highest priority will be identified to fill the available memory. In some implementations, a defined quantity of MAC addresses with the highest priority may be selected to receive a filter. In other implementations, the MAC addresses may be heapified, such that MAC addresses that qualify for the heap (described further in FIGS. 4-8) may apply for a filter.

Once the subset of MAC addresses is identified that qualify for a filter, the method further provides identifying (205) a filter configuration for the subset of MAC addresses and applying the filter configuration at the physical network interfaces. In identifying the filter configuration, load balancer operation 200 may use the dispatch statistics from first virtual switch 130 to ensure that each of the MAC addresses is receiving an appropriate amount of processing resources. This may include directing packets for each of the MAC addresses into processing queues to prevent one virtual machine (associated with a MAC address) from overwhelming the operations of other virtual machines operating on host 100. In some implementations, applying the filter configuration may include adding, modifying, and removing filters employed at the physical network interface, wherein the filters are each configured to identify attributes (such as MAC addresses in the present example) and place the packets into processing queues based on the identified attributes. For example, a first packet received with a MAC address associated with virtual node 123 may be placed in a different processing queue than a packet received with a MAC address associated with virtual node 125. In general, packets in different processing queues may be handled by threads running on different CPU cores, thereby distributing the load for processing incoming packets across multiple CPU cores. It is advantageous to ensure that packets in a particular flow (e.g., having the same destination MAC address or for a particular TCP session) be processed from the same queue to reduce the risk of out-of-order delivery of the packets.

In some implementations, communications for virtual nodes may be encapsulated within secondary headers with secondary MAC addresses. Because the physical network interfaces may be incapable of filtering on the basis of inner packet headers, which appear as payload for the outer, secondary header, the filters for these packets require the MAC address for the overlay header. In these examples, load balancer operation 200 may be used to identify any overlay configuration information associated with a virtual node and apply a filter that uses the overlay information. Further, when multiple MAC addresses share the same overlay header, the dispatch statistics for those MAC addresses may be aggregated in determining a filter for the MAC addresses.

Figure 3:
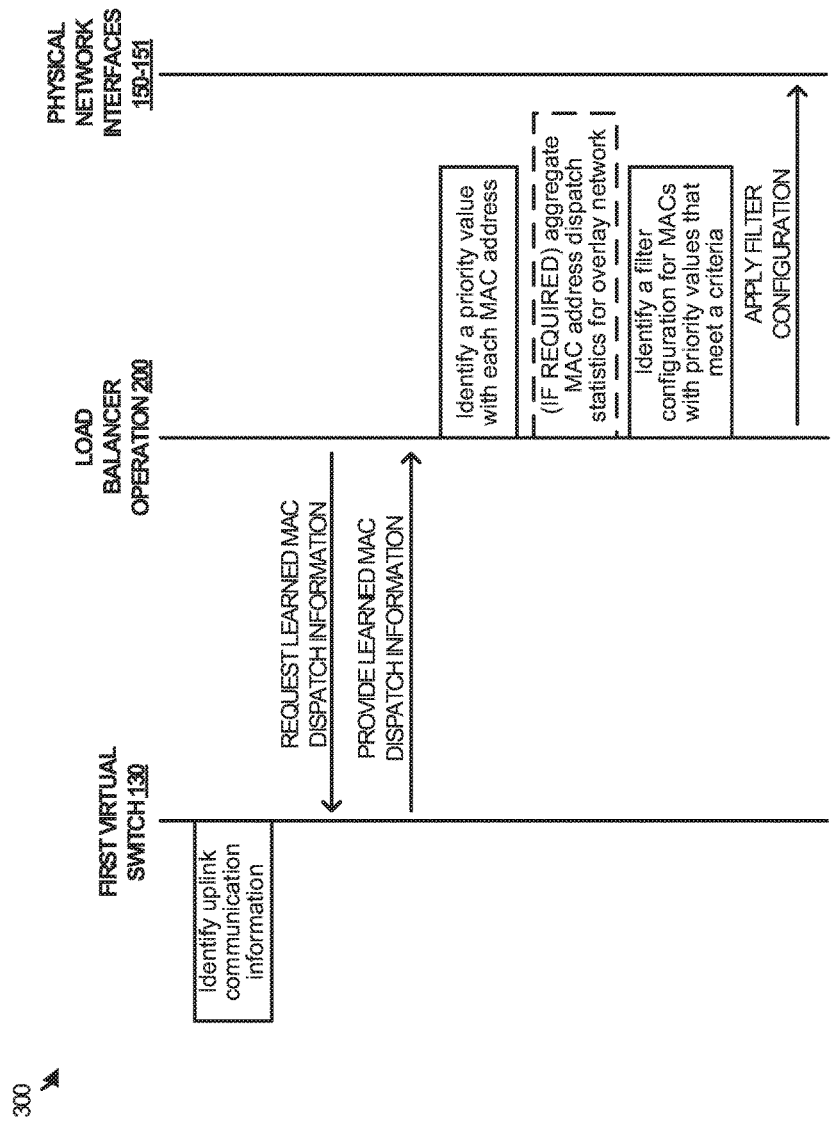
FIG. 3 illustrates a timing diagram of managing packet filter at physical network interfaces according to an implementation.

FIG. 3 illustrates a timing diagram 300 of managing packet filters at physical network interfaces according to an implementation. Timing diagram 300 includes first virtual switch 130, load balancer operation 200, and physical network interfaces 150-151 form host 100 of FIG. 1.

In operation, as virtual nodes communicate over virtual switch 130, virtual switch 130 identifies MAC addresses for the virtual nodes along with dispatch information corresponding to the communications for the virtual nodes. As the dispatch information is maintained, load balancer operation 200 may request learned MAC dispatch information from first virtual switch 130, and responsively be provided with the learned MAC dispatch information. This dispatch information may include the MAC addresses for currently communicating virtual nodes, uplink and downlink statistics for the amount of data being communicated by each of the MAC addresses, and priority information indicating the order of which each of the MAC addresses was identified.

In some implementations, the priority information may indicate the order of which each of the MAC addresses was learned on their corresponding VNIC port. For example, if virtual node 123 were the first MAC address identified from VNIC 141, then virtual node 123 may be provided with a value of "0001" for VNIC 141, whereas if virtual node 124 were the second MAC address identified from VNIC 141, then virtual node 124 may be provided with a value of "0002" for VNIC 141. In this manner, the lower the value, the higher the priority the virtual node for that particular VNIC port.

Similar to the operations of creating a value for each MAC address for the associated VNIC port, each of the MAC addresses may also be associated with a value for the physical network interface. As an example, if virtual node 120 were the first virtual node communicating via first physical network interface 150, then virtual node 120 (and the associated MAC address) may receive a value of "0001." Once a second node communicates over first physical network interface 150, such as virtual node 123, that node may receive a value of "0002."

Once the dispatch information is obtained by load balancer operation 200, load balancer operation 200 may identify a priority value associated with each of the MAC addresses based on the priority information supplied by first virtual switch 130. In some implementations, this may include applying a function to the priority information values supplied by first virtual switch 130. This may include adding the values associated with the VNIC port and physical port, multiplying the values, or some other operation with the values for the VNIC port and physical port for each MAC address. Once the priority value is determined for each of the MAC addresses, then load balancer operation 200 may identify a filter configuration for MAC addresses with priority values that meet filter criteria. In some implementations, the MAC addresses may be heapified, wherein the MAC addresses that qualify for the heap may receive a filter, while those that do not qualify may not receive a filter.

Once the MAC addresses are identified for receiving a filter, load balancer operation 200 may use the uplink and downlink statistics from the dispatch information to ensure that each of the qualifying MAC addresses receives an adequate quality of service from the processing system of the host. This will include generating a filter configuration that identifies attributes (MAC addresses) in received packets, and placing the packets in processing queues to provide the requisite quality of service to each of the MAC addresses. These queues may each be allocated clock cycles, processing cores, or some other similar division of the processing resources of host 100.

In some implementations, if overlay networks are used on host 100, such as those employed by Virtual Extensible Local Area Network (VXLAN) tunnel endpoints (VTEPs), load balancer operation 200 may further be required identify if any overlay configuration is used for each identified MAC address. If an identified MAC address from first virtual switch 130 corresponds to an overlay network, any filter generated for the MAC address may instead use the MAC address associated with the overlay header. For example, if first virtual switch 130 were coupled to a VTEP that provided an overlay for virtual nodes 120, then the MAC address associated with the VTEP may be used over MAC address associated with virtual node 120. Moreover, if multiple MAC addresses use the same overlay information (i.e. the same overlay MAC address), then the dispatch statistics may be aggregated for MAC addresses. This may include aggregating the uplink and downlink quantity of data being communicated by the MAC addresses.

Although FIG. 3 demonstrates a single configuration of physical network interfaces 150-151, it should be understood that load balancer operation may repeat the described processes at intervals. These intervals may be periodic, based on the current load at physical network interfaces 150-151, or at any other similar interval. For example, load balancer operation 200 may query first virtual switch for dispatch statistics every two minutes to determine a new filter configuration for physical network interfaces 150-151.

Figure 4:
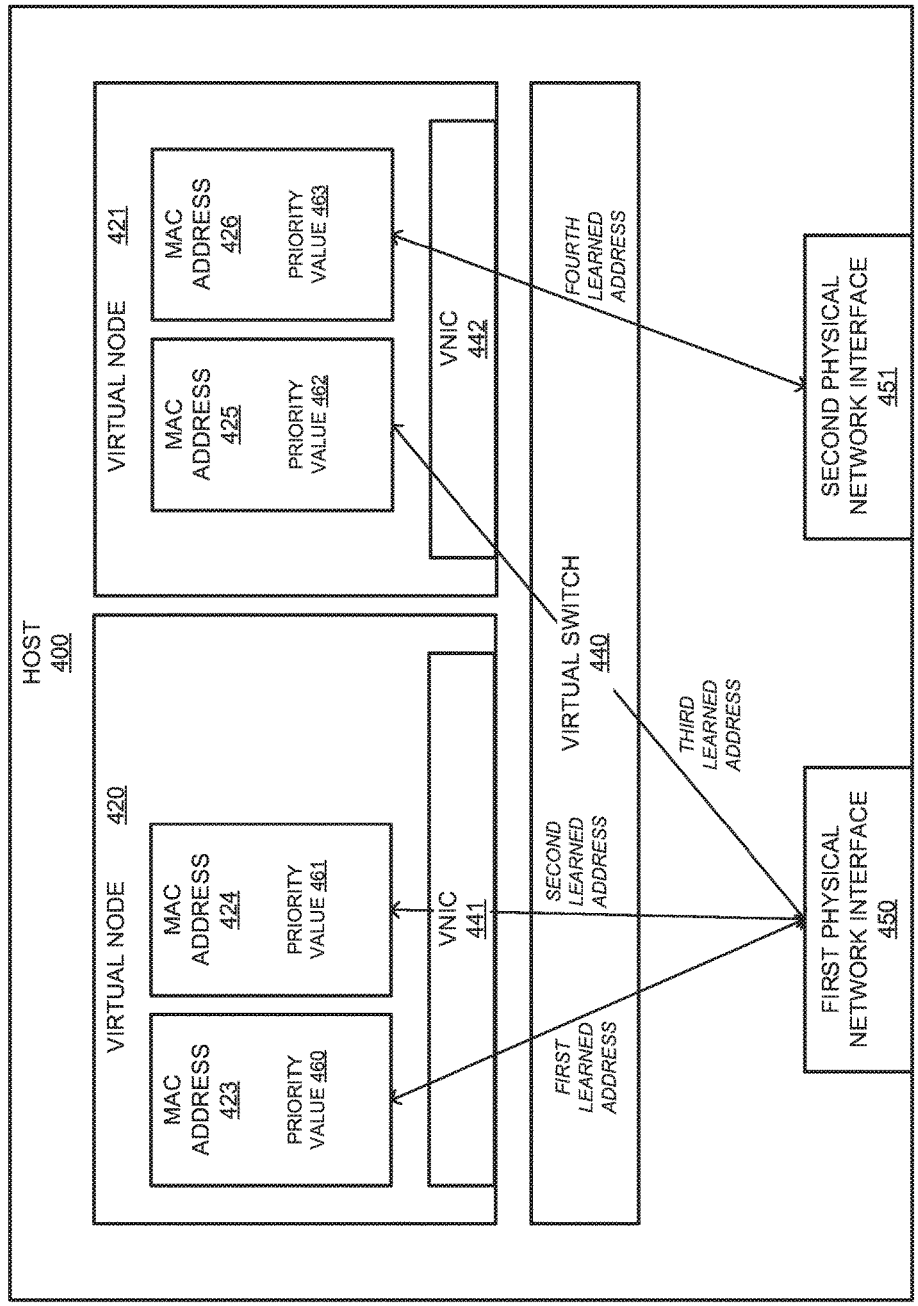
FIG. 4 illustrates a host that provides a platform for a plurality of virtual nodes according to an implementation.

FIG. 4 illustrates a host 400 that provides a platform for a plurality of virtual nodes according to an implementation. Host 400 includes virtual nodes 420-421, virtual switch 440, and physical network interfaces 450-451. Virtual nodes 420-421 further include VNICs 441-442 and MAC addresses 423-426, wherein the MAC addresses are representative of MAC addresses learned by virtual switch 440 during the communications of the virtual nodes.

In operation, as virtual nodes communicate via virtual switch 440, virtual switch 440 identifies or learns MAC addresses associated with the nodes. For example, when MAC address 423 communicates over first physical network interface 450, virtual switch 440 starts maintaining dispatch statistics for the MAC address. These dispatch statistics include information about transmitted and received data for the MAC address, as well as information about the order that the MAC address was identified on the virtual network interface port and the order of which the MAC address was identified on the physical network interface. Based on the identified dispatch statistics, which are provided to a load balancing operation, the load balancing operation may allocate a priority to each of the MAC addresses. Here, MAC addresses 423-426 are allocated priority values 460-463 (FIG. 5), respectively, which can then be used to determine and allocate which of the MAC addresses are to receive a packet filter.

FIG. 5 illustrates a data structure 500 to manage priority information for MAC addresses identified for virtual nodes on a host according to an implementation. Data structure 500 is an example data structure that can be used on host 400 of FIG. 4 to manage the priorities of learned MAC addresses. Data structure 500 includes columns for MAC addresses 510, VNIC port identifier (ID) 512, VNIC port value 514, physical network interface (NIC) ID, physical NIC priority value 518, and overall priority value 520. Although demonstrated in the example of FIG. 5 as a single data structure, it should be understood that any number of linked lists, arrays, data trees, or some other data structure may be used in managing the priority values for learned MAC addresses.

As described previously with respect to FIG. 4, as virtual nodes communicate via virtual switch 440 may identify the MACs and monitor dispatch statistics for the learned MAC addresses. Here, the dispatch statistics identified for the virtual nodes include values associated with the order of which the virtual node was learned on the corresponding VNIC, and the order of which the virtual node was learned on the corresponding physical network interface. For example, MAC address 423 is the first learned address for both VNIC 441 and first physical network interface 450. As a result, MAC address 423 receives a VNIC priority value in VNIC priority value 514 of "0000," and a physical NIC priority value in physical NIC priority value 518 of "0000." These values may then be combined to generate value 460 for the overall priority of the MAC address. This combination may include adding the values, multiplying the values, appending one of the values to the end of the other value, or some other operation with respect to the values.

As another example, referring to MAC address 425 is the third learned MAC address by virtual switch 440. Here, MAC address 425 is allocated a VNIC priority value of "0000" because it is the first MAC learned on VNIC 442, but is provided a physical NIC priority value of "0002" because it is the third MAC learned on physical network interface 450. From these values, an overall priority value 462 may be generated that is different than the value that was generated for MAC address 423.

Once the values are generated, the load balancing operation on the host may use the values to determine which of the MAC addresses is to receive a filter, and generate a filter configuration for the learned MAC addresses. This filter configuration may be used to ensure that the MAC addresses that qualify for filters receive an adequate quality of service from the processing system on the host.

Figure 6:
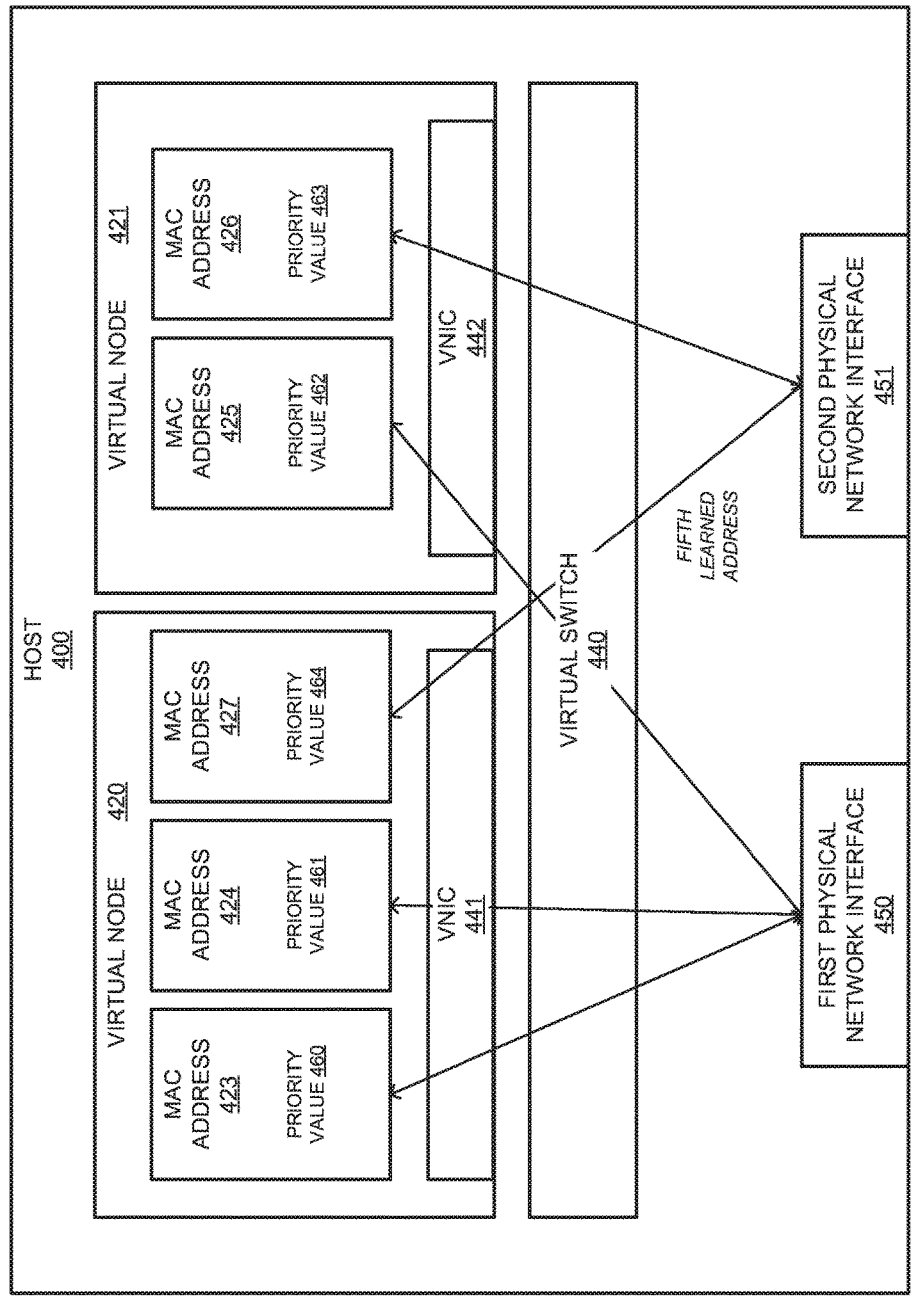
FIG. 6 illustrates a host that provides a platform for a plurality of virtual nodes according to an implementation.

FIG. 6 illustrates a host 400 that provides a platform for a plurality of virtual nodes according to an implementation. FIG. 6 is an extension of the operations described in FIGS. 4 and 5 above, and includes the same systems and elements as host 400 in FIG. 4 with the addition of MAC address 427 with priority value 464.

As depicted, when a new virtual node is initiated on the host and communicates data over the physical network, virtual switch identifies the new node and monitors dispatch statistics for the corresponding MAC address. These dispatch statistics are then provided to a load balancing operation on the host that will identify MAC addresses to receive a filter, and generate filters based on the received statistics.

FIG. 7 illustrates a data structure 700 to manage priority information for MAC addresses identified for virtual nodes on a host according to an implementation. Data structure 700 is representative of an updated data structure of data structure 500 for a load balancing operation executing on host 400.

In the particular example of data structure 700, MAC address 427 has been identified by virtual switch 440, and information about the MAC address has been provided to the load balancing operation to support the implementation of packet filters at the physical network interfaces. In some implementations, the dispatch statistics for the MAC addresses may be supplied periodically by the virtual switch, but it should be understood that that the statistics may be supplied in response to a request by the load balancing operation, or at any other similar interval.

Once the dispatch statistics are provided to the load balancing operation, the load balancing operation may determine a priority value associated with the MAC address. Here, MAC address 427 is the third MAC address that is learned on VNIC 441. As a result, MAC address is allocated a VNIC priority value of "0002." Further, because the MAC address is the second MAC address to be learned on physical network interface 451, the MAC address is allocated a physical NIC priority value of "0001." After the values are supplied and identified by the load balancing operation, the load balancing operation may generate an overall priority value for the MAC address as described herein. This value may then be used in conjunction with filter criteria to determine whether the MAC address is to receive a filter. In some implementations, the MAC addresses with the highest priority value (or lowest priority value depending on how the value is generated) may be selected until a threshold for the interfaces is reached. In some implementations, the priority values associated with the MAC addresses may be heapified, and any values that qualify for the heap may be selected to receive a filter. It should also be understood that other operations of sorting the priority values may be used in determining which of the MAC addresses are to receive a filter.

Although demonstrated in the example above as adding a MAC address, it should be understood that the virtual switch may also be responsible for identifying when a MAC address is no longer communicating over the virtual switch or has "timed out." Once this is detected by the virtual switch, dispatch statistics for the timed out MAC address may no longer be provided to the load balancing operation, and the load balancing operation may cease to generate or consider the priority value associated with the MAC address. Consequently, when timed out, the load balancing operation may be permitted to provide a filter to an alternative MAC address in some examples.

Figure 8:
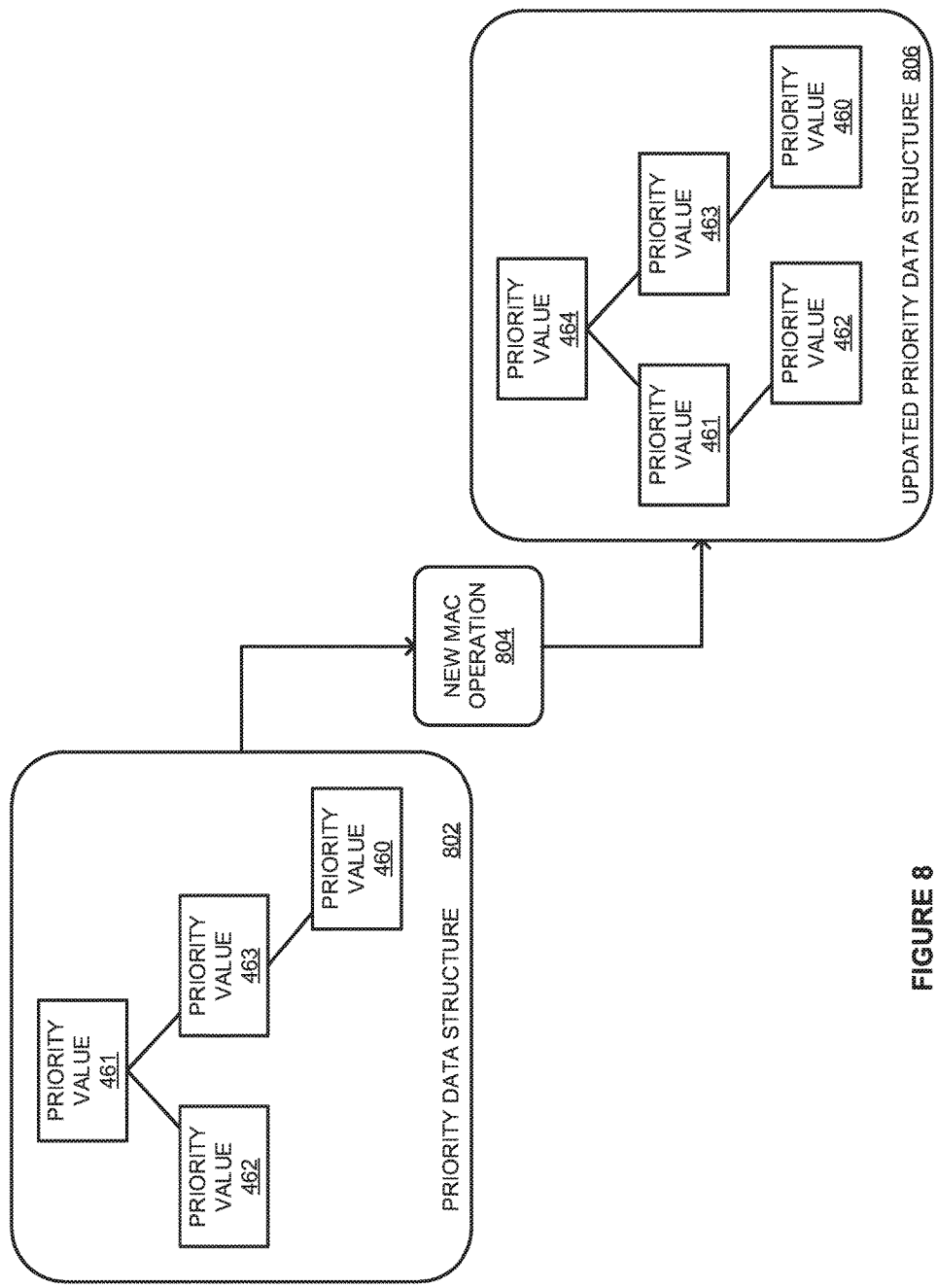
FIG. 8 illustrates an overview of managing priority for virtual node MAC addresses according to an implementation.

FIG. 8 illustrates an overview 800 of managing priority for virtual node MAC addresses according to an implementation. Overview 800 is an example of managing the priority values for MAC addresses described above in FIGS. 4-7. Although illustrated in the present example as using a heap to determine which of the MAC addresses to receive a filter, it should be understood that other criteria and operations may be used to determine which of the MAC addresses receive a filter.

As depicted, in priority data structure 802, which is representative of the state of host 400 in FIG. 4, a heap is maintained that includes priority values 460-463. At the top of the heap is the priority value that is the last to receive a filter in the current configuration. Accordingly, if a new MAC address were identified with a higher priority than priority value 461 and the physical network interfaces were limited to four filters for MAC addresses, priority value 461 may be replaced within the data structure to maintain the proper heap configuration.

Here, when a new MAC is identified by the virtual switch and dispatch statistics are provided to the load balancing operation, the load balancing operation may employ new MAC operation 804 to update the heap and generate updated priority data structure 806. In the present implementation, because the heap is not limited to four MAC addresses, priority value 464 is added to the heap that is representative of the value for MAC address 427 added to host 400 in FIG. 6. Once added to the heap, the heap may be updated (e.g. values may be moved up or down the data structure) to ensure that the lowest priority value is at the top of the heap. This heap may then be updated over time by adding and removing values as the dispatch information is obtained from the virtual switch.

In some implementations, the heap may be configured to a limited number of entries. In such examples, the MAC addresses with priority values that qualify for the heap or meet the heaps criteria may have a filter applied while the MAC addresses with priority values that do not qualify for the heap or meet the heaps criteria may not have a filter made available for the MAC address. For example, when priority value 464 is attempted to be added to the heap, but the heap is limited to four numbers, priority value 464 may be added if that value is of a higher priority than another value in the heap, or may be prevented from being added if the value is less of a priority than the lowest priority value already in the heap.

Once the values that qualify for the heap are identified, the load balancing operation may then identify a filter configuration for the physical network interfaces of the host. This filter configuration may add, modify, or remove existing filters, and may identify attributes in received packets and place the packets in processing queues to provide an adequate quality of service to the MAC addresses that qualify for a filter.

Figure 9:
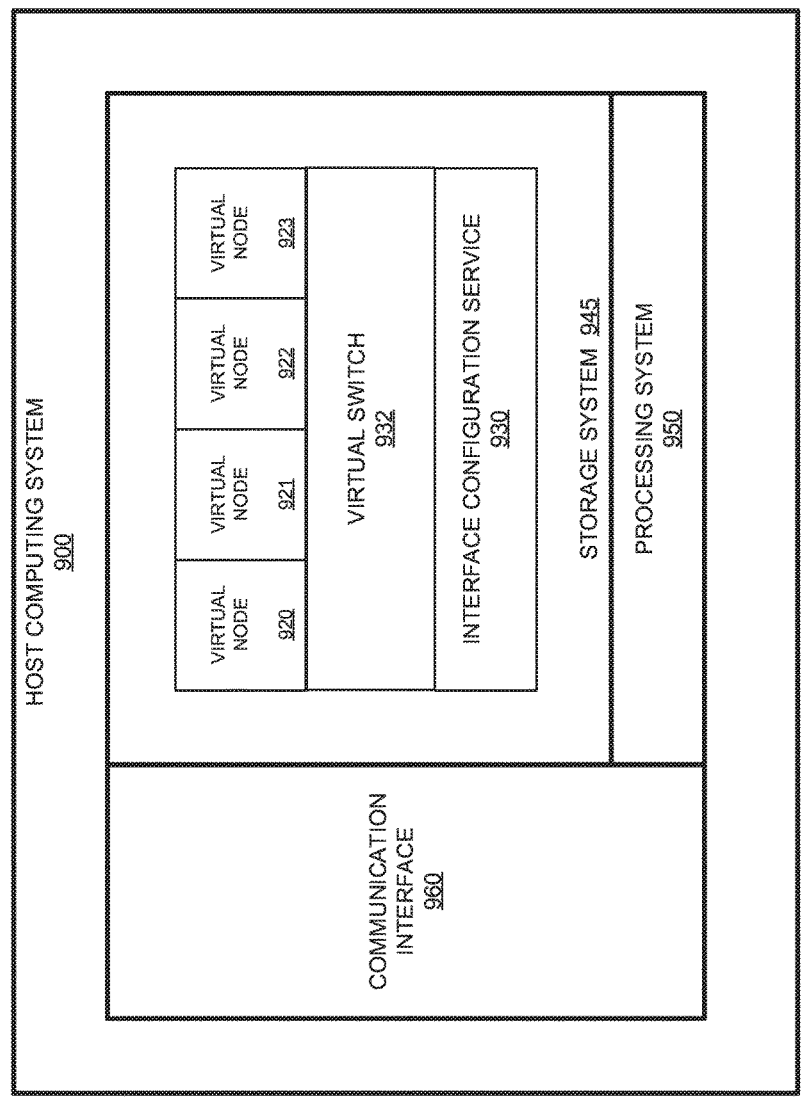
FIG. 9 illustrates a host computing system to provide a platform for virtual nodes according to an implementation.

FIG. 9 illustrates a host computing system 900 for a plurality of virtual nodes according to an implementation. Host computing system 900 is representative of any computing system or systems with which the various operational architectures, processes, scenarios, and sequences disclosed herein can be implemented. Host computing system 900 is an example of host 100 of FIG. 1, although other examples may exist. Host computing system 900 includes storage system 945, processing system 950, and communication interface 960. Processing system 950 is operatively linked to communication interface 960 and storage system 945. Communication interface 960 may be communicatively linked to storage system 945 in some implementations. Host computing system 900 may further include other components such as a battery and enclosure that are not shown for clarity.

Communication interface 960 comprises components that communicate over communication links, such as network cards, ports, radio frequency (RF), processing circuitry and software, or some other communication devices. Communication interface 960 may be configured to communicate over metallic, wireless, or optical links. Communication interface 960 may be configured to use Time Division Multiplex (TDM), Internet Protocol (IP), Ethernet, optical networking, wireless protocols, communication signaling, or some other communication format—including combinations thereof. Communication interface 960 is an example of physical network interface 150 and may be configured to communicate with other host computing systems in a computing environment, and may further be configured to communicate with one or more other networked computing systems and devices. Communication interface 960 may include hardware and software systems capable of filtering packets based on a configuration provided by interface configuration service 930.

Processing system 950 comprises microprocessor and other circuitry that retrieves and executes operating software from storage system 945. Storage system 945 may include volatile and nonvolatile, removable and non-removable media implemented in any method or technology for storage of information, such as computer readable instructions, data structures, program modules, or other data. Storage system 945 may be implemented as a single storage device, but may also be implemented across multiple storage devices or sub-systems. Storage system 945 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 950 is typically mounted on a circuit board that may also hold the storage system. The operating software of storage system 945 comprises computer programs, firmware, or some other form of machine-readable program instructions. The operating software of storage system 945 comprises virtual nodes 920-923, virtual switch 932, and interface configuration service 930 (representative of load balancer operation 200 of FIG. 1). The operating software on storage system 945 may further include an operating system, utilities, drivers, network interfaces, applications, or some other type of software. When read and executed by processing system 950 the operating software on storage system 945 directs host computing system 900 to operate as described herein.

In operation, processing system 950 executes virtual nodes 920, wherein virtual nodes 920-923 may comprise full operating system virtual machines or containers. To facilitate communications for the virtual nodes, processing system 950 further executes virtual switch 932, wherein virtual switch 932 may inspect packets to and from the virtual nodes and forward or block the packets based on the inspection. Here, in addition to the packet forwarding operations provided by virtual switch 932, virtual switch 932 may further maintain dispatch statistics for virtual nodes 920-923. These dispatch statistics may comprise a number of packets and/or bytes transmitted and received by each MAC address (associated with a virtual node) over communication interface 960, as well as priority information for the order of which each MAC address was identified. In particular, interface configuration service 930 may, when read and executed by processing system 950, direct processing system 950 to obtain dispatch statistics associated with MAC addresses for virtual nodes executing on host computing system 900. In some implementations, the dispatch statistics may come as a key-value pair, wherein the MAC address for a virtual node represents the key and the dispatch statistics represent the value.

As the dispatch statistics are obtained by interface configuration service 930, interface configuration service 930 may determine a priority value associated with each of the MAC addresses. This priority value is based on the virtual network interface port that the MAC address was learned on for the virtual switch, and the physical network interface that the MAC address was learned on. In some implementations, the priority value may be determined based on the order that the MAC address was learned on the virtual interface and the physical interface in relation to other MAC addresses. However, it should also be understood that some virtual network interfaces may also be provided with a higher priority value than other virtual network interfaces on the same virtual switch, which may be configurable by an administrator of the host computing system.

Once the priority values are determined, a subset of the MAC addresses that qualify for a packet filter may be selected, wherein the subset is identified based on MAC addresses that meet the qualifying criteria. In some implementations, in determining whether a MAC address should be selected for a filter, interface configuration service 930 may heapify the MAC addresses to determine which of the MAC addresses should be made available for a filter. In particular, by heapifying the MAC addresses, and of the MAC addresses that qualify for the heap may be identified as the MAC addresses to receive a filter, whereas the MAC addresses that do not qualify for the heap may not qualify for the heap.

Once the subset of MAC addresses is identified, the dispatch statistics may be used by interface configuration service 930 to determine a filter configuration for communication interface 960 and apply the filter configuration at communication interface 960. This filter configuration may include one or more filters that identify attributes, such as destination MAC addresses in packets received at communication interface 960, and place the packets in a corresponding processing queue. In some implementations, the filter configuration may add, modify, or remove (if the MAC address timed out or no longer had adequate priority) to ensure that each of the MAC addresses received an adequate quality of service.

In some examples, when the filters are applied by interface configuration service 930, the filters may be required to identify and implement the filters based on an overlay configuration for the MAC address. In these examples, filters may be incapable of identifying the MAC address for a virtual node, but rather may be required to identify the MAC address for the overlay header. In such situations, the filter may be generated using the overlay MAC address, and any MAC addresses that share an overlay MAC address may have their dispatch statistics aggregated to generate a combined filter for the MAC addresses.

The various examples disclosed herein provide enhancements for managing data packet communications for virtual nodes over a physical network interface. In particular, host computing systems may execute virtual switches that comprise software modules capable of providing switching operations, routing operations, distributed firewall operations, and the like. These modules may inspect the packets for various traits, such as internet protocol (IP) addresses, MAC addresses, packet type information, or any other similar information, and provide forwarding operations based on the identified traits. The forwarding operations may include permitting a communication to be forwarded to the appropriate destination, blocking the communication, modifying the communication, or any other similar operation. The forwarding operations may include forwarding packets locally between nodes on the same host computing system, and may further include forwarding packets as they are received from secondary physical computing systems.

In some implementations, multiple virtual switches may be deployed on the same host computing system. For example, a first virtual switch may be coupled to a plurality of virtual machines. Further, within one of the virtual machines, a second virtual switch may execute that provides software defined networking operations for secondary virtual nodes within the virtual machine. These secondary virtual nodes may comprise full operating system virtual machines, or may include containers capable of sharing kernel resources provided by the host virtual machine.

In some examples, in addition to virtual switches and virtual nodes on a host computing system, a load balancer operation may be included that is used to manage network packets as they are received and/or transmitted over a physical network interface of the host. This load balancer operation may configure the physical network interface to identify traits or attributes within packets received over the interface and place the packets within appropriate processing queues, wherein the processing queues may be provided with a portion of clock cycles, processing cores, memory resources, or some other similar processing resource. By inspecting the packets at the physical network interface, the load balancer operation may ensure that packets for each virtual node are allocated a desired quality of service.

Here, in providing the configuration of the physical network interface, the load balancer operation may rely on information provided by a virtual switch executing on the host. In particular, as virtual nodes communicate over a virtual switch on the host, the virtual switch may be used to identify media access control (MAC) addresses associated with the virtual nodes. Additionally, the virtual switch may identify other dispatch statistics for the virtual nodes. These dispatch statistics may include the virtual network interface port that the MAC address was learned on, the order of which the MAC address was identified on the virtual network interface port in relation to other MAC addresses of the same port, the physical network interface that the MAC address was learned on (e.g. for the first communication), the order of which the MAC address was identified on the physical network interface in relation to other MAC addresses on the same physical interface, or some other similar information about the virtual network interface and/or physical network interface for the MAC address. Further, the dispatch statistics may include information about the quantity of data being communicated by each of the MAC addresses, such as the number of packets transmitted by each MAC address, a number of packets received by each MAC address, a number of bytes transmitted by each MAC address, a number of bytes received by each MAC address, or some other similar dispatch statistic.

Once the dispatch information is obtained by the load balancer operation, the load balancer operation may determine which of the MAC addresses is to receive a filter at the physical network interfaces. To make this determination, the load balancer operation may use at least information about the order of which the MAC addresses were identified on the corresponding virtual network interface (VNIC) ports and the order of which the MAC addresses were identified on the corresponding physical network interface (PNIC) port. For example, when a first MAC address is learned as communicating at a first VNIC and using a first PNIC. A value may be assigned corresponding to the MAC address being the first MAC address using the first VNIC, and a second value may be assigned corresponding to the MAC address being the first MAC address using the first PNIC. Once the values are identified for the corresponding MAC address, a priority score may be determined for the MAC address, which can be compared to other MAC addresses learned at the virtual switch. Once compared with the other MAC addresses, a subset of the MAC addresses may be selected to receive a filter based on the subset that meets filter criteria. Accordingly, when there is a limited amount of resources available to support the filters for the MAC addresses, only MAC addresses that meet the priority criteria will be selected for a filter.

After the subset of MAC addresses are selected, the load balancer operation may then generate the required filter configuration based on the dispatch statistics obtained from the virtual switch. In particular, the load balancer operation may generate filters to ensure that the MAC addresses are receiving an adequate quality of service. This may include filters that identify attributes within the packets and place the packets in processing queues to ensure that each of the MAC addresses is receiving adequate resources. For example, if a first MAC address were receiving a large number of packets, the filters may be used to limit the amount of processing resources provided to the first MAC address, and instead permit packets to be processed for other virtual nodes operating on the host system.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of managing packet filters for physical network interfaces of a host computing system, the method comprising:
    obtaining dispatch statistics for media access control (MAC) addresses associated with virtual nodes communicating over the physical network interfaces via a virtual switch;
    for each MAC address in the MAC addresses, identifying a priority value based on a virtual network interface port and a physical network interface of the physical network interfaces that the MAC address was identified on by the virtual switch;
    identifying a subset of the MAC addresses that meet filter criteria based on the priority values;
    identifying a filter configuration for the subset of the MAC addresses based on the dispatch statistics for the subset of the MAC addresses, wherein the filter configuration classifies received packets at the physical network interfaces into processing queues based on attributes identified in the received packets; and
    applying the filter configuration at the physical network interfaces.

2. The method of claim 1 further comprising transferring a request to the virtual switch for the dispatch statistics.

3. The method of claim 1, wherein the dispatch statistics comprise:
    a number of packets transmitted by each MAC address of the MAC addresses;
    a number of packets received by each MAC address of the MAC addresses;
    a number of bytes transmitted by each MAC address of the MAC addresses; and/or
    a number of bytes received by each MAC address of the MAC addresses.

4. The method of claim 1, wherein the virtual nodes comprise virtual machines or containers.

5. The method of claim 1, wherein the attributes identified in the received packets comprise destination MAC addresses identified in the received packets.

6. The method of claim 1, wherein identifying a priority value based on a virtual network interface port and a physical network interface of the physical network interfaces that the MAC address was identified on by the virtual switch comprises identifying a priority value based on an order of which the MAC address was identified on the virtual network interface port in relation to other MAC addresses by the virtual switch and an order of which the MAC address was identified on the physical network interface in relation to other MAC addresses by the virtual switch.

7. The method of claim 1, wherein identifying a priority value based on a virtual network interface port and a physical network interface of the physical network interfaces that the MAC address was identified on by the virtual machine comprises:
    identifying a first value for the MAC address associated with the virtual network interface port that the MAC address was identified on by the virtual switch;
    identifying a second value for the MAC address associated with the physical network interface that the MAC address was identified on by the virtual switch; and
    generating a priority value for the MAC address based on the first and second values.

8. The method of claim 1, wherein identifying the subset of the MAC addresses that meet the filter criteria based on the priority values comprises heapifying the MAC addresses to determine the subset of the MAC addresses that meet the filter criteria.

9. A computing system comprising:
    one or more non-transitory computer readable storage media;
    a processing system operatively coupled to the one or more non-transitory computer readable media; and
    program instructions stored on the one or more non-transitory computer readable storage media to manage packet filters for physical network interfaces of the computing system that, when read and executed by the processing system, direct the processing system to at least:
        obtain dispatch statistics for media access control (MAC) addresses associated with virtual nodes communicating over the physical network interfaces via a virtual switch;
        for each MAC address in the MAC addresses, identify priority value based on a virtual network interface port and a physical network interface of the physical network interfaces that the MAC address was identified on by the virtual switch;
        identify a subset of the MAC addresses that meet filter criteria based on the priority values;
        identify a filter configuration for the subset of the MAC addresses based on the dispatch statistics for the subset of the MAC addresses, wherein the filter configuration classifies received packets at the physical network interfaces into processing queues based on attributes identified in the received packets; and
        apply the filter configuration at the physical network interfaces.

10. The computing system of claim 9, wherein the program instructions further direct the processing system to transfer a request to the virtual switch for dispatch statistics.

11. The computing system of claim 9, wherein the dispatch statistics comprise:
   a number of packets transmitted by each MAC address of the MAC addresses;
   a number of packets received by each MAC address of the MAC addresses;
   a number of bytes transmitted by each MAC address of the MAC addresses; and/or
   a number of bytes received by each MAC address of the MAC addresses.

12. The computing system of claim 9, wherein the virtual nodes comprise virtual machines or containers.

13. The computing system of claim 9, wherein the attributes identified in the received packets comprise destination MAC addresses identified in the received packets.

14. The computing system of claim 9, wherein identifying a priority value based on a virtual network interface port and a physical network interface of the physical network interfaces that the MAC address was identified on by the virtual switch comprises identifying a priority value based on an order of which the MAC address was identified on the virtual network interface port in relation to other MAC addresses by the virtual switch and an order of which the MAC address was identified on the physical network interface in relation to other MAC addresses by the virtual switch.

15. The computing system of claim 9, wherein identifying a priority value based on a virtual network interface port and a physical network interface of the physical network interfaces that the MAC address was identified on by the virtual machine comprises:
   identifying a first value for the MAC address associated with the virtual network interface port that the MAC address was identified on by the virtual switch;
   identifying a second value for the MAC address associated with the physical network interface that the MAC address was identified on by the virtual switch; and
   generating a priority value for the MAC address based on the first and second values.

16. The computing system of claim 1, wherein identifying the subset of the MAC addresses that meet the filter criteria based on the priority values comprises heapifying the MAC addresses to determine the subset of the MAC addresses that meet the filter criteria.

17. An apparatus comprising:
   one or more non-transitory computer readable storage media; and
   program instructions stored on the one or more non-transitory computer readable storage media to manage packet filters for physical network interfaces of the computing system that, when read and executed by a processing system, direct the processing system to at least:
   obtain dispatch statistics for media access control (MAC) addresses associated with virtual nodes communicating over the physical network interfaces via a virtual switch;
   for each MAC address in the MAC addresses, identify priority value based on a virtual network interface port and a physical network interface of the physical network interfaces that the MAC address was identified on by the virtual switch;
   identify a subset of the MAC addresses that meet filter criteria based on the priority values;
   identify a filter configuration for the subset of the MAC addresses based on the dispatch statistics for the subset of the MAC addresses, wherein the filter configuration classifies received packets at the physical network interfaces into processing queues based on attributes identified in the received packets; and
   apply the filter configuration at the physical network interfaces.

18. The apparatus of claim 17, wherein the dispatch statistics comprise:
   a number of packets transmitted by each MAC address of the MAC addresses;
   a number of packets received by each MAC address of the MAC addresses;
   a number of bytes transmitted by each MAC address of the MAC addresses; and/or
   a number of bytes received by each MAC address of the MAC addresses.

19. The apparatus of claim 17, wherein identifying a priority value based on a virtual network interface port and a physical network interface of the physical network interfaces that the MAC address was identified on by the virtual switch comprises identifying a priority value based on an order of which the MAC address was identified on the virtual network interface port in relation to other MAC addresses by the virtual switch and an order of which the MAC address was identified on the physical network interface in relation to other MAC addresses by the virtual switch.

20. The apparatus of claim 17, wherein identifying the subset of the MAC addresses that meet the filter criteria based on the priority values comprises heapifying the MAC addresses to determine the subset of the MAC addresses that meet the filter criteria.

* * * * *